UNITED STATES PATENT OFFICE.

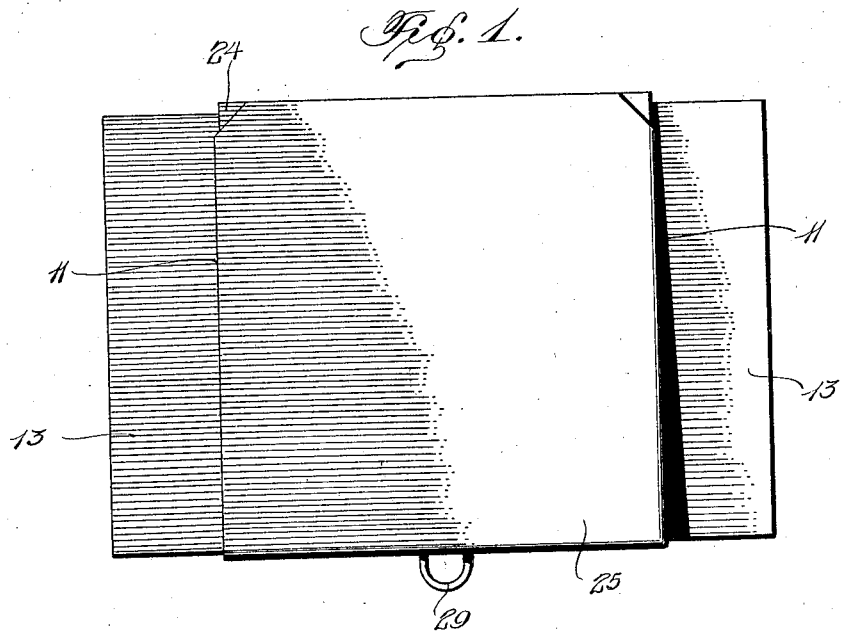
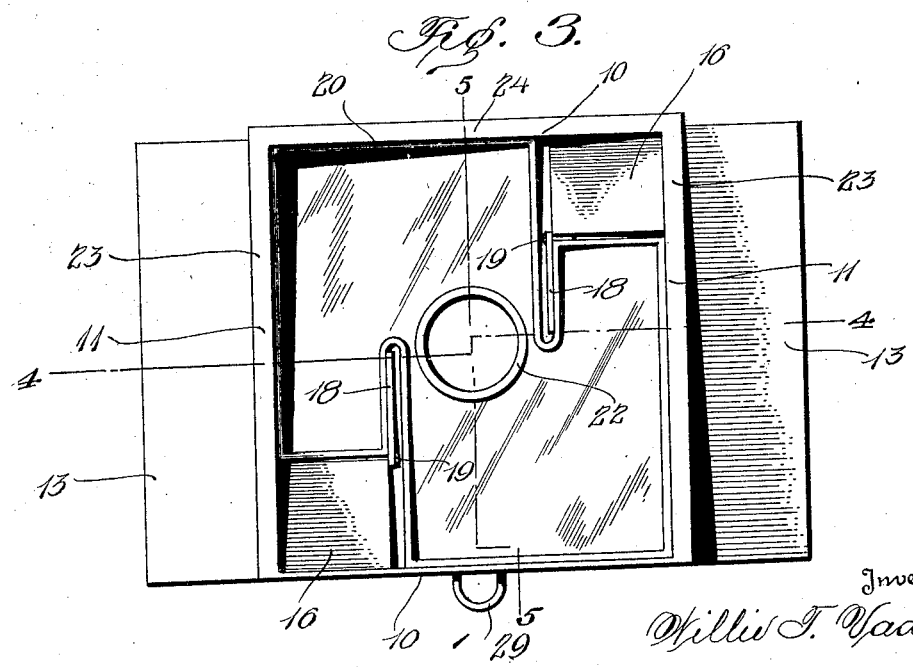

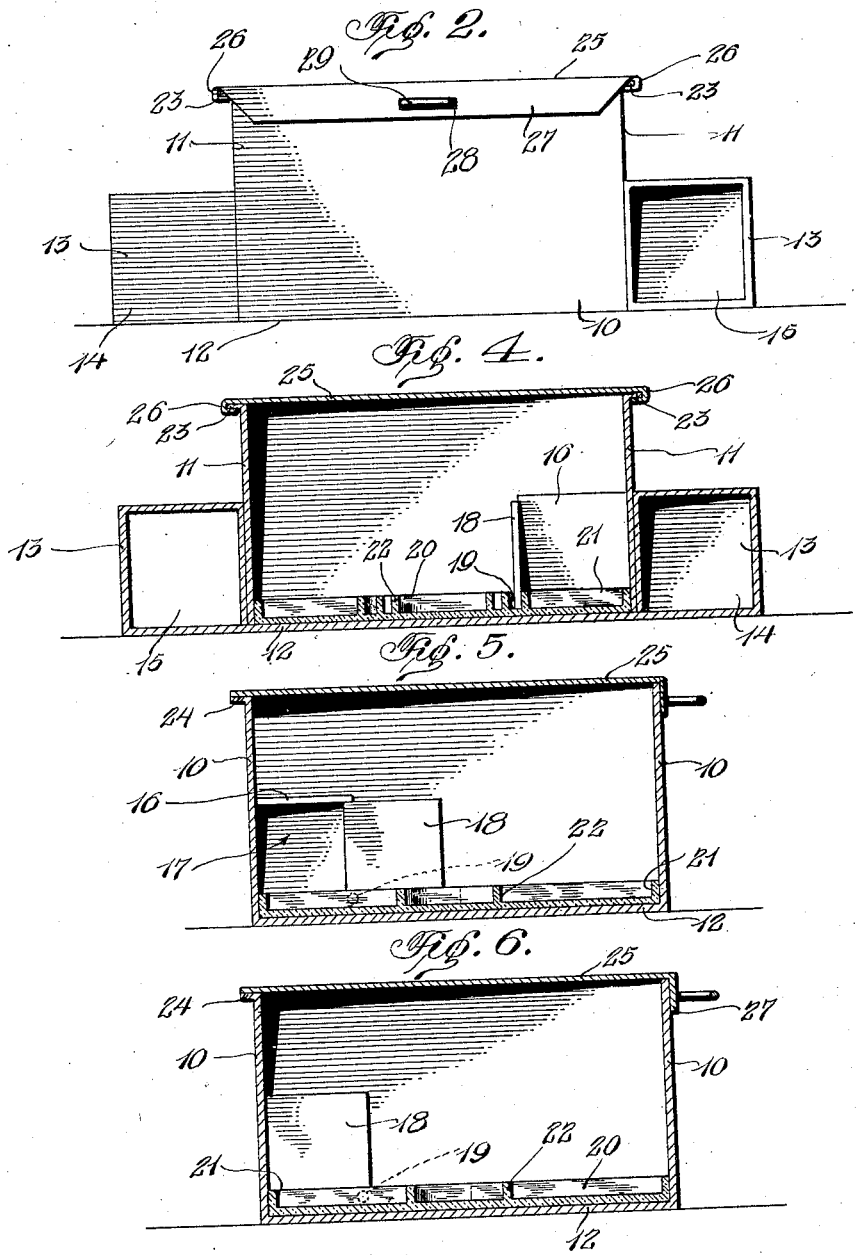

WILLIE T. VADEN, JR., OF DAYTON, TEXAS.

MOUSE AND RAT POISONER.

1,393,590.

Specification of Letters Patent.

Patented Oct. 11, 1921.

Application filed April 2, 1920. Serial No. 370,676.

*To all whom it may concern:*

Be it known that I, WILLIE T. VADEN, Jr., a citizen of the United States, residing at Dayton, in the county of Liberty and State of Texas, have invented new and useful Improvements in Mouse and Rat Poisoners, of which the following is a specification.

This invention relates to devices for destroying animals such as rats and mice and has for its object the provision of a device within which is disposed some attractive bait and also some suitable poison, the device being provided with a plurality of openings so formed and arranged as to prevent other animals from gaining access to the poison.

An important object is the provision of a device of this character which is so formed as to prevent spilling of the poison in the event that the device is tilted in certain directions, the cover and sides of the body being provided with interengaging flanges for this purpose and movable doors being provided at the entrance openings which will automatically close if the device is upset.

Another object is the provision of a device of this character in which is disposed a peculiarly shaped poison container so that the poison will be kept from contact with the walls of the device.

An additional object is the provision of a device of this character which will be simple and inexpensive in manufacture, highly efficient in the destruction of these troublesome animals, durable in service, and a general improvement in the art.

With the above and other objects and advantages in view, the invention consists in the details of construction to be hereinafter more fully described and claimed, and illustrated in the accompanying drawings in which—

Figure 1 is a plan view of the device,

Fig. 2 is a side elevation, thereof,

Fig. 3 is a plan view with the cover removed,

Fig. 4 is a cross sectional view with the entrance passages also in section, taken on the line 4—4 of Fig. 3.

Fig. 5 is a cross sectional view taken on the line 5—5 of Fig. 3, showing the door in open or normal position, and Fig. 6 is a similar view showing the door swung to closed position.

Referring more particularly to the drawings, I have shown my device as comprising a rectangular casing including side walls 10, end walls 11, and a bottom 12. Secured upon the end wall 11 and having a length equal to the width thereof, are passage members 13 which are also rectangular in cross section and which are closed at one end, as shown at 14, and open at the other end, as shown at 15, the open ends being at diagonally opposite ends of the casing. Disposed within the opposite diagonal corners of the casing are rectangular passage members 16 which communicate with the passage members 13 through openings 17 in the end walls 11.

The inner ends of the passage members 16 are open and may be closed by means of doors formed as plates 18, one of which is pivoted, as shown at 19, upon each passage member 16, at one lower corner thereof. It will be seen that in one position the plates 18 will close the inner ends of the passage members 16 and that in the other position they will leave the passage members open, whereby to permit access of the animal into the interior of the casing.

Disposed upon the bottom 12 is a tray 20, formed preferably of glass or other similar material and this tray is provided with a continuous upstanding marginal flange 21. At diagonally opposite corners the tray 20 is cut away, as shown, for the accommodation of the passage members 16 and at such cut away corners the flanges 21 are inwardly extended for the accommodation of the door plates 18 when they are swung into non-obstructing position with relation to the passage members 16. Centrally, the tray is provided with an upstanding circular flange 22 within which is adapted to be disposed bait for attracting rats or mice to the device. The poison is disposed within the tray surrounding the flange 22, the poison being prevented from spilling on account of the flanges 21.

The end walls 11 and one side wall are provided with outwardly extending flanges 23 and 24, and associated with the casing is a cover 25 which has its sides provided with inturned flanges 26 slidably engaging the flanges 23, the rear edge of the cover engaging flat upon the flange 24. At its forward edge the cover 25 carries a flange 27 having a slot 28 adapted to engage over a staple 29 projecting from the casing and within which may be engaged a padlock or other suitable device for holding the cover closed.

In the use of the device bait is placed within the confines of the flange 22 and the poison is poured into the tray around the bait, that is between the flanges 21 and 22. The door plates 18 are of course moved into the non-obstructing position with respect to the inner ends of the passage member 16. In the operation of the device it will be seen that the rats and mice will be attracted to the device by odor of the bait employed and will enter the passage members 13 and pass through the openings 17 into the internal passage members 16 and thence into the interior of the casing where they will eat the poison which of course must be of such a nature that it will be attractive and palatable.

In the event that the device should be tilted or moved around in any way, the provision of the flange 21 will prevent spilling of the poison out of the tray. If the device should by chance be inverted it will be seen that spilling of the poison will be prevented by the close interengagement of the flanges on the casing and the cover. In the event that the device should be tilted to a considerable extent to either side, it will be seen that the door plate at the lowest side will gravitationally swing so as to close the inner end of the lowermost passage member so as to prevent the poison from running out of the device.

From the foregoing description and a study of the drawings it will be apparent that I have thus provided a very simple and inexpensive device which will very efficiently operate for poisoning rats and mice without being a menace to other animals or to children.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a rectangular casing provided with entrance openings, a cover normally closing said casing, a door pivoted adjacent each entrance opening and adapted to swing in a vertical plane for closing the opening when the casing is excessively tilted in a certain direction, and a tray within said casing adapted to contain bait and poison.

2. A device of the character described comprising a casing provided with a removable cover, a passage member extending lengthwise of each of two opposite sides of the casing externally thereof and each having one end open and the other end closed, the wall of the casing adjacent the closed end of each passage member being provided with an opening communicating with the passage member, passage members within said casing communicating with each of said openings, a tray within said casing adapted to contain poison, said tray being cut away to accommodate said second named passage members, and means operable upon tilting the casing in certain directions for closing the lowermost of the second named passage members.

3. A device of the character described comprising a casing provided with a removable cover, a passage member extending lengthwise of each of two opposite sides of the casing externally thereof and each having one end open and the other end closed, the wall of the casing adjacent the closed end of each passage member being provided with an opening communicating with the passage member, passage members within said casing communicating with each of said openings, a tray within said casing adapted to contain poison, said tray being cut away to accommodate said second named passage members, and means operable upon tilting the casing in certain directions for closing the lowermost of the second named passage members, said means comprising a plate pivoted at the open inner end of each of said passage members.

In testimony whereof I affix my signature.

WILLIE T. VADEN, Jr.